(12) United States Patent
Meisho

(10) Patent No.: US 8,182,197 B2
(45) Date of Patent: May 22, 2012

(54) GRIPPING DEVICE AND SYSTEM INCLUDING THE SAME

(75) Inventor: Ken Meisho, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 12/605,972

(22) Filed: Oct. 26, 2009

(65) Prior Publication Data

US 2010/0109360 A1    May 6, 2010

(30) Foreign Application Priority Data

Oct. 30, 2008  (JP) ................... 2008-279872
Oct. 1, 2009   (JP) ................... 2009-229652

(51) Int. Cl.
*B25J 19/00*    (2006.01)
(52) U.S. Cl. .............. 414/735; 74/490.06; 414/729; 901/49
(58) Field of Classification Search .......... 414/729, 414/735; 901/49, 29; 74/490.06
See application file for complete search history.

(56) References Cited

U.S. PATENT DOCUMENTS

| | | | |
|---|---|---|---|
| 3,984,006 A | 10/1976 | Takeyasu et al. | |
| 4,179,783 A | 12/1979 | Inoyama et al. | |
| 4,540,331 A * | 9/1985 | Stanner et al. | 414/730 |
| 4,702,667 A * | 10/1987 | Hounsfield et al. | 414/735 |
| 4,714,865 A * | 12/1987 | Chin et al. | 318/563 |
| 4,818,173 A * | 4/1989 | Khusro | 414/735 |
| 4,818,174 A * | 4/1989 | Arpiarian et al. | 414/735 |
| 4,842,114 A * | 6/1989 | Hepp | 192/56.32 |
| 4,925,360 A * | 5/1990 | Kato | 414/730 |

FOREIGN PATENT DOCUMENTS

| | | |
|---|---|---|
| GB | 1450788 | 9/1976 |
| JP | 61-241083 A | 10/1986 |

* cited by examiner

*Primary Examiner* — Donald Underwood
(74) *Attorney, Agent, or Firm* — Canon USA Inc. IP Division

(57) ABSTRACT

In a gripping device, a displacement-type force sensor is provided on a side of a driving mechanism opposite fingers to which the driving mechanism is connected to form a grip section. The driving mechanism is supported on a housing with an elastic member being disposed therebetween at a position closer to the fingers than the center of gravity of the grip section.

9 Claims, 6 Drawing Sheets

GRIPPING DEVICE AND SYSTEM INCLUDING THE SAME

BACKGROUND OF THE INVENTION

1. Field of the Invention

The present invention relates to a gripping device attached to, for example, a leading end of an arm of an industrial robot so as to grip and assemble various components. More particularly, the present invention relates to a gripping device that detects the assembly reaction force during assembly of components and performs assembly while controlling the assembly force, and that is applicable to automated assembly with an industrial robot.

2. Description of the Related Art

In recent years, there is an increasing demand for automated manufacturing of products having a complicated structure, for example, cameras. For such products, it is necessary to perform high-speed and accurate assembly with a small industrial robot under fine force control.

Japanese Patent Laid-Open No. 61-241083 discloses a technique of controlling a robotic arm and a hand while detecting the assembly force with a displacement sensor provided between the robotic arm and the hand in order to accurately and reliably assemble a gripped component.

FIG. 7 shows a basic device configuration and a signal transmission system disclosed in the above publication. Referring to FIG. 7, a component "a" is gripped by fingers provided in a grip section G, and is assembled into a workpiece "b". A driving unit, such as a motor, 23 operates a robotic arm A. To the driving unit 23, a control unit 24 inputs an operation signal and a position control signal for the robotic arm A.

A calculation unit 25 calculates the relative displacement between the robotic arm A and the grip section G in six axial directions on the basis of detection signals from displacement sensors provided in a sensor unit 10. The calculation unit 25 is provided with an allowance setting unit 27 for setting an allowance that allows the component "a" to be properly assembled into the workpiece "b". A comparator 26 compares a displacement obtained from the calculation unit 25 and the set allowance, outputs the comparison result to the driving unit 23, and operates the robotic arm A so that the actual displacement is within the allowance.

FIG. 8 is a detailed view of the sensor unit 10, and FIG. 9 is a cross-sectional plan view, taken along line IX-IX of FIG. 8. Referring to FIG. 8, the sensor unit 10 includes an arm-side plate 11 to be attached to the leading end of the robotic arm A, a grip-section-side plate 12 to be attached to the grip section G, and elastic members 13 that couple and support the plates 11 and 12. The sensor unit 10 also includes a displacement detection mechanism provided between the plates 11 and 12. The displacement detection mechanism includes a beam 14 extending from the arm-side plate 11 toward the grip-section-side plate 12 and having a cross-shaped leading end portion.

As shown in FIG. 9, the cross-shaped leading end portion of the beam 14 has X-direction displacement sensors 15 and 16 provided on opposite side faces parallel to the Y-axis, and Y-direction displacement sensors 17 and 18 provided on opposite side faces parallel to the X-axis. On a surface of the cross-shaped leading end portion facing the grip-section-side plate 12, displacement sensors 19, 20, 21, and 22 are provided to face the grip-section-side plate 12 with a predetermined gap therebetween. The grip-section-side plate 12 is provided with protruding pieces 33, 34, 35, and 36 respectively facing the X-direction displacement sensors 15 and 16 and the Y-direction displacement sensors 17 and 18 with a predetermined gap therebetween.

With these structures, the robotic arm A is operated by the driving unit 23 according to a predetermined program input from the control unit 24 so that the component "a" gripped by the fingers of the grip section G is assembled (inserted) into the workpiece "b". In this case, when there is a relative positional error between the component "a" and the workpiece "b", the elastic members 13 are bent by the contact of the component "a" with the workpiece "b", and a displacement of the grip section G relative to the robotic arm A is detected from the bending. By performing the inserting operation in a state in which the relative displacement is within a predetermined allowance, proper assembly is realized while preventing the component "a", the workpiece "b", and the gripping device from damage.

In the gripping device of the above related art, however, the sensor unit 10 is connected between the robotic arm A and the grip section G in series. When the sizes of the gripping device and the sensor unit 10 are reduced, it is difficult to ensure both a high force detection sensitivity of the sensor unit 10 and a high-speed operation, as follows.

The size of the sensor unit 10 in the longitudinal direction of the arm can be reduced only by shortening the distance between the arm-side plate 11 and the grip-section-side plate 12, because the elastic members 13 are provided therebetween. However, when the distance is shortened, the lengths of not only the elastic members 13 but also the beam 14 are reduced. Consequently, there is little distance between a support point of the beam 14 and the displacement sensors, and the amount of displacement detected by the detection sensors decreases. Hence, the detection sensitivity (the ratio of the displacement amount detected by the displacement sensors to the applied force) decreases.

On the other hand, the detection sensitivity can be increased by replacing the elastic members 13 with more flexible members so as to reduce the rigidity of the elastic members 13. Unfortunately, when the rigidity of the elastic members 13 decreases, the grip section G easily wobbles with respect to the robotic arm A. For this reason, during driving of the robotic arm A, it takes much time to stably position the gripping device.

This point will be described in detail. In the related art shown in FIG. 7, since the sensor unit 10 is connected in series between the robotic arm A and the grip section G, deformation fulcrums of the elastic members 13 in the sensor unit 10 are away from the center of gravity of the grip section G. Consequently, a moment produced by an inertial force due to the positional difference between the deformation fulcrums of the elastic members 13 and the center of gravity of the grip section G has a great influence on the grip section G during driving of the robotic arm A, and it also takes much time to stably position the sensor unit 10 connected to the grip section G. The time necessary for stable positioning increases as the rigidity of the elastic members 13 decreases.

When the gripping device of the related art is driven at a high speed in order to enhance the working efficiency, the above-described moment increases as the speed increases, and the time necessary for stable positioning increases. Although the rigidity of the elastic members needs to be increased in order to shorten the time for stable positioning, the increase in rigidity reduces detection sensitivity of the sensor unit, and makes it difficult to accurately detect the force.

In this way, in the gripping device of the related art, when the size of the sensor unit is reduced in the longitudinal direction of the robotic arm, it is difficult to ensure both a high detection sensitivity and a high operation speed.

The present invention provides a gripping device including a force sensor that achieves size reduction and speedup without decreasing detection sensitivity of a sensor unit.

The present invention also provides a gripping device incorporating a force sensor that minimizes the influence of an excessive moment on a sensor unit because of an inertial force during operation of a robotic arm, and that realizes a shorter positioning time and a higher operation speed.

The present invention further provides a gripping device including a force sensor that increases rigidity of elastic members, minimizes the difference in sensitivity between detection axes of the force sensor, and enables accurate force detection.

SUMMARY OF THE INVENTION

A gripping device that grips a component according to an aspect of the present invention includes a gripping section having at least one griping element configured to grip the component, and a driving mechanism connected to the gripping element for driving the gripping element; a housing; an elastic member disposed between the housing and the driving mechanism; and force sensor units provided on an end portion of the driving mechanism opposite the gripping element and at a position on the housing facing the end portion. The elastic member is provided between a first position at or near the center of gravity of the gripping section, and a second position at or near the gripping element.

A system for controlling a robotic arm according to another aspect of the present invention includes the above-described gripping device, wherein the gripping device is configured for attachment to the robotic arm; and a control unit configured to control the robotic arm and the gripping device.

With the above configuration, since a great distance can be ensured between the force sensor units and the deformation fulcrum of the elastic member even when the size is reduced, displacement of one force sensor relative to the other force sensor is increased. Thus, in spite of size reduction, a sufficient detection sensitivity can be ensured. Moreover, there is no need to decrease the rigidity of the elastic member to a degree such that the grip section wobbles relative to the robotic arm. Hence, it is possible to achieve a high force detection sensitivity of the force sensor units and high speed operation.

The elastic member can be configured to be provided at or near the center of gravity of the grip section.

With the above structure, since the center of gravity of the grip section substantially coincides with the deformation fulcrum of the elastic member, it is possible to minimize the influence of the moment, which is produced by the inertial force due to the positional difference between the deformation fulcrum of the elastic member and the center of gravity of the grip section, on the force sensor units. Therefore, an excessive moment produced by the inertial force during operation of the force sensor units attached to the robotic arm does not have any influence. This shortens the time for stable positioning, and further increases the operation speed.

The elastic member can include a plurality of elastic materials and support members for the elastic materials.

With the above structure, the flexibility in designing rigidities of the displacement axes by combining the elastic materials increases, and desired rigidities can be designed while minimizing the difference in rigidity among the displacement axes (directions). By forming the elastic materials by leaf springs, the rigidity of the elastic member can be increased.

Since the sensitivity difference among the detection axes of the force sensors can thus be reduced while increasing the rigidity of the elastic member, accurate force detection is possible.

According to the present invention, the size of the force sensor units can be reduced while achieving both a high detection sensitivity of the force sensor units and restriction of the increase in stable positioning time during high speed movement of the robotic arm.

Further, according to the present invention, it is possible to minimize the influence of the moment, which is produced by the inertial force due to the positional difference between the deformation fulcrum of the elastic member and the center of gravity of the grip section, on the force sensor units. Therefore, in particular, the time necessary for stable positioning can be shortened and speedup can be realized.

In addition, the sensitivity difference among the detection axes of the force sensors can be reduced. Further, when the elastic materials are formed by leaf springs, the rigidity of the elastic member can be increased, and the sensitivity difference among the detection axes of the force sensors can be reduced while increasing the rigidity of the elastic member. This achieves accurate force detection.

Further features of the present invention will become apparent from the following description of exemplary embodiments with reference to the attached drawings.

DESCRIPTION OF THE EMBODIMENTS

A basic configuration of an embodiment of the present invention will be described below with reference to FIGS. 1 to 4. The embodiment of the present invention provides a small gripping device including a force sensor. The gripping device grips and assembles a component of a small product, such as a camera, while controlling the force at a high speed.

Figure 1:
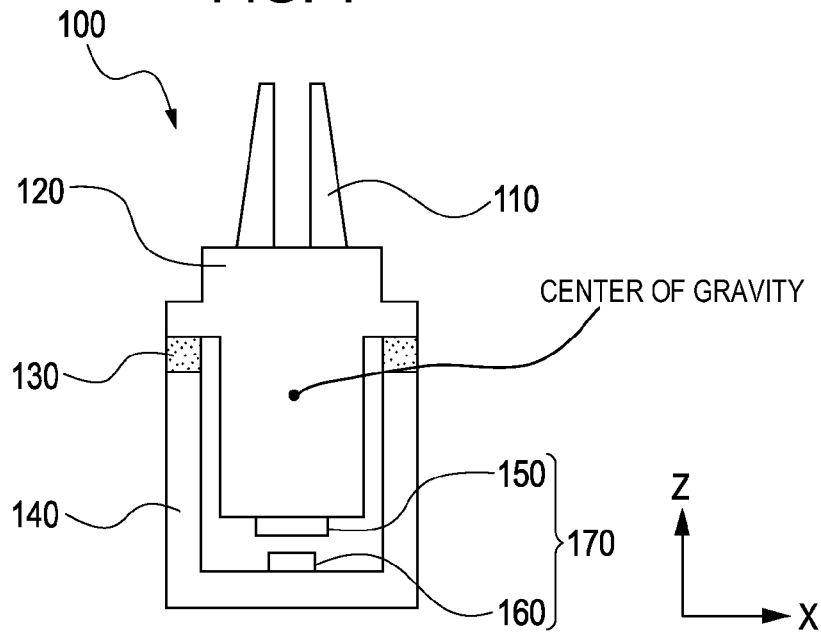
FIG. 1 is a schematic structural view of an embodiment of the present invention.

Referring to FIG. 1, a gripping device 100 includes detachable fingers 110 for gripping a component, and a driving mechanism 120, such as a motor, for driving the fingers 110. A plurality of fingers 110 and the driving mechanism 120 are connected to form a grip section.

The gripping device 100 also includes an elastic member 130 that is elastically deformed by a force received by the grip section, force sensor units 170 for detecting an assembly reaction force produced during gripping and assembly of the component, and a gripping device housing 140 in which a part of the driving mechanism 120 is stored. A straight line linking the midpoint between the two fingers 110 and the centers of the force sensor units 170 is referred to as a Z-axis. In FIG. 1, an upward direction is a +Z-direction, a rightward direction is a +X-direction, and a direction toward the back side of the plane of the figure is a +Y-direction.

The number of fingers 110, the number of joints, and elasticity are selected in accordance with the component and the assembly operation, and the grip section can have various shapes. Alternatively, fingers of various shapes may be interchangeably attached to the driving mechanism 120 without changing the driving mechanism 120. In this case, preferably, a coupling portion to the driving mechanism 120 is commonly used so that various types of fingers can be attached.

The driving mechanism 120 is a mechanism that is driven in connection with the fingers 110, and includes a unit of mechanical members, such as gears and links, an actuator, etc. The driving mechanism 120 is fixed to the gripping device housing 140 with the elastic member 130 being disposed therebetween in a manner such that the attitude thereof is changeable. In short, since the driving mechanism 120 connected to the fingers 110 is supported by the gripping device housing 140 via the elastic member 130, it can change its attitude relative to the gripping device housing 140 by the load applied to the fingers 110 or the driving mechanism 120.

A pair of displacement type force sensor units 170 are respectively provided on an end portion of the driving mechanism 120 opposite the fingers 110 and a wall surface of the gripping device housing 140 facing the end portion. The force sensor units 170 include a displacement output element 150 provided on the driving mechanism 120, and a displacement detection element 160 provided on the opposing gripping device housing 140. To adjust the distance between the displacement output element 150 and the displacement detection element 160, the driving mechanism 120 may further include a member on which the displacement output element 150 is mounted.

With the above-described configuration, vibration of the driving mechanism 120, such as a motor, attenuates while propagating to the members. Hence, the advantage of being able to prevent noise contamination of signals detected by the force sensor units 170 can be expected.

EXAMPLES

Figure 2:
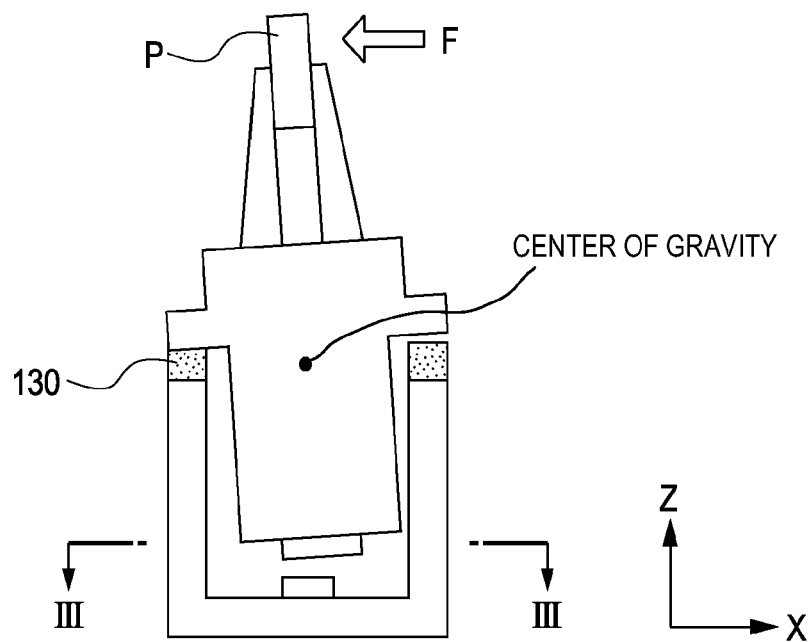
FIG. 2 shows a state in which a component is gripped by a grip section and a force is applied during assembly in the embodiment.

Referring to FIGS. 1 and 2, a description will be given below of a state in which the gripping device 100 grips and assembles a component P. In FIG. 2, F represents an operating force in an XY plane of an assembly reaction force applied to the fingers 110 when the component P is gripped and assembled. The driving mechanism 120 is displaced relative to the gripping device housing 140 on the elastic member 130, as shown in FIG. 2.

The force sensor units 170 are defined by a mechanism formed by a combination of a Hall element for detecting the displacement of the driving mechanism 120 relative to the gripping device housing 140, and a permanent magnet serving as a magnetic-field generating source. The mechanism is not particularly limited to the above-described magnetic displacement sensor as long as it can detect the displacement.

Figure 3:
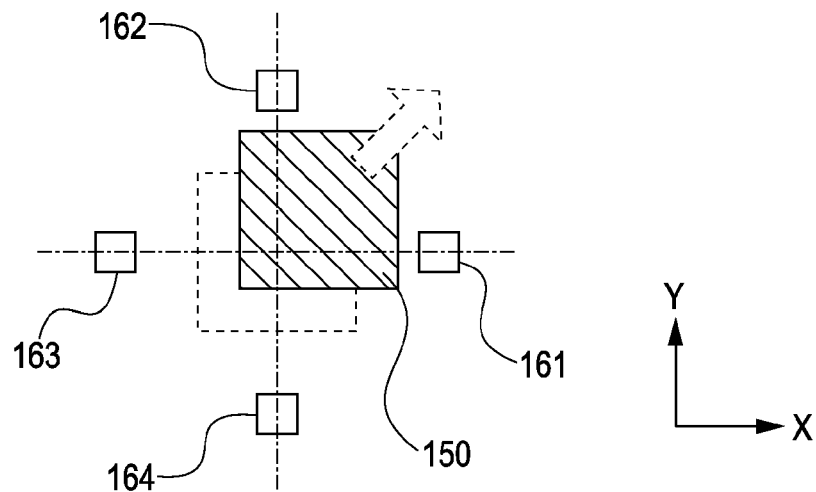
FIG. 3 is an enlarged cross-sectional plan view of a displacement detection unit in the embodiment, taken along line III-III of FIG. 2.

A calculation unit (not shown) calculates an operating force F from the displacement amount detected by the force sensor units 170. FIG. 3 is a cross-sectional plan view, taken along line III-III of FIG. 2. For example, in a case in which the displacement output element 150 is a permanent magnet and the displacement detection element 160 includes displacement detection elements 161, 162, 163, and 164 serving as Hall elements, as shown in FIG. 3, when the distances between the permanent magnet and the Hall elements change, the density of magnetic flux flowing into the Hall elements changes, whereby the displacement amount of the driving mechanism 120 relative to the gripping device housing 140 can be detected.

By placing the displacement detection elements 161, 162, 163, and 164 (four in total) at +X-, −X-, +Y-, and −Y-positions on the gripping device housing 140, respectively, not only the displacement amount, but also the displacement direction can be detected. When it is assumed that the operating force F during assembly acts in the −X-direction and the −Y-direction in the XY plane, the displacement output element 150 displaces in the +X-direction and the +Y-direction. Therefore, outputs from the displacement detection elements 161 and 162 at the +X position and the +Y position increase, and outputs from the displacement output elements 163 and 164 at the −X position and the −Y position decrease, whereby the volume and direction of the assembly operating force F can be detected.

Figure 4:
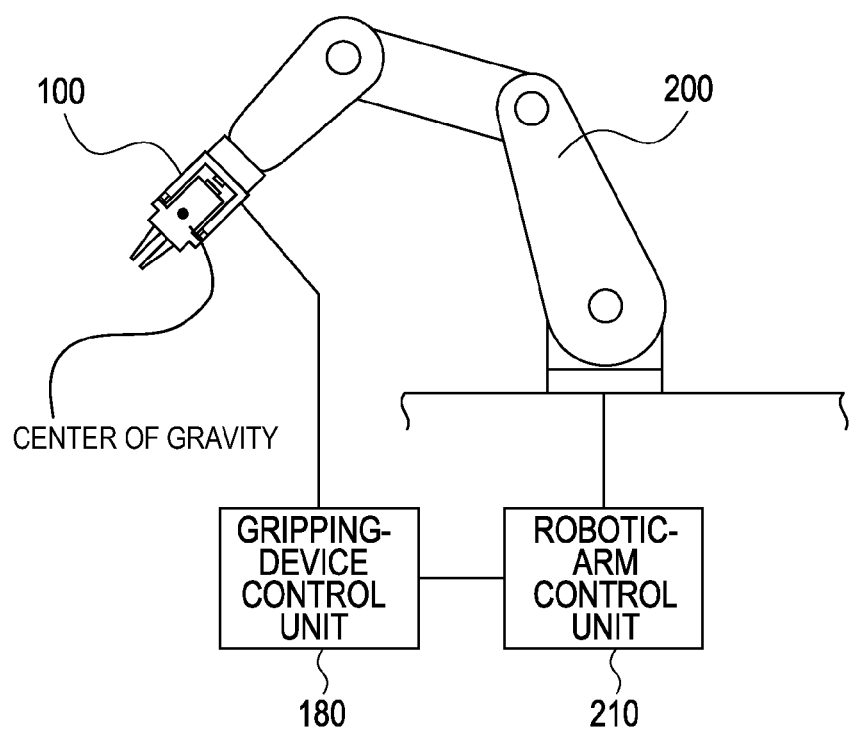
FIG. 4 shows a state in which a gripping device of the embodiment is mounted to a robotic arm.

FIG. 4 schematically shows the above-described gripping device 100 attached to a robotic arm 200 and control units for the robotic arm 200 and the gripping device 100. A gripping-device control unit 180 is connected to the gripping device 100. The gripping-device control unit 180 controls the operation of the gripping device 100, and also performs calculation for converting a displacement signal detected by the force sensor units 170 into force.

A robotic-arm control unit 210 is connected to the robotic arm 200. The robotic-arm control unit 210 controls the operation of the robotic arm 200, and receives information about the force applied to the fingers 110 of the gripping device 100 from the grip-device control unit 180 to reflect the information in the operation of the robotic arm 200.

The elastic member 130 is located to support the wall surface of the driving mechanism 120. More specifically, the elastic member 130 is located to support a portion of the wall surface at or near the center of gravity of the grip section. The centre of gravity of the grip section can be adjusted (e.g. to give a low or high centre of gravity to the grip section) by specifically designing the component(s) of the driving mechanism (e.g. motor) to give a desire centre of gravity. The centre of gravity of the grip section may also be adjusted by changing the position of the elastic member 130 relative to the housing 140 and the driving mechanism 120. The inertial force acting during operation of the robotic arm 200 is mainly applied to the driving mechanism 120 and the fingers 110 connected via the elastic member 130.

As long as the time taken to stably position the grip section relative to the gripping device housing 140 does not extremely increase, the elastic member 130 may be provided between a position at or near the center of gravity of the grip section and the fingers 110, e.g. at or near the position where the fingers 110 are coupled to the driving mechanism 120. In this case, the distance from the fulcrum of attitude deformation to the force sensor units 170 can be further increased. For example, when the total distance of the grip section in the longitudinal direction is a distance L, the distance between the elastic member 130 and the force sensor units 170 is greater than or equal to 40% of the distance L. Therefore, even when the same operating force F is applied to the fingers 110, the displacement amount of the displacement output element 150 and the displacement detection element 160 can be increased greatly. This allows more accurate force sensing.

A description will now be given of a series of assembly operations performed under force control. When the gripped component P comes into contact with another component to which the component P is to be assembled, the assembly operating force F is received by the fingers 110 attached to the driving mechanism 120, and the elastic member 130 is thereby bent. The operating force F is detected by the force sensor units 170, as described above.

Displacement information detected by the force sensor units 170 is transmitted to the gripping-device control unit 180, and the volume and direction of the operating force F applied to the fingers 110 are calculated by the calculator in the gripping-device control unit 180. The calculation result is then transmitted to the robotic-arm control unit 210. On the basis of the transmitted information about the operating force F, the robotic-arm control unit 210 performs assembly while controlling the operation of the robotic arm 200 so that the applied operating force F is within a predetermined range in order to prevent the component P and the robotic arm 200 from damage.

Since the elastic member 130 is provided between the fingers 110 and the force sensor units 170, as described above, even when the size of the force sensor units 170 is reduced, a long distance can be ensured between the force sensor units 170 and the elastic member 130 serving as the deformation fulcrum of the driving mechanism 120.

Figure 8:
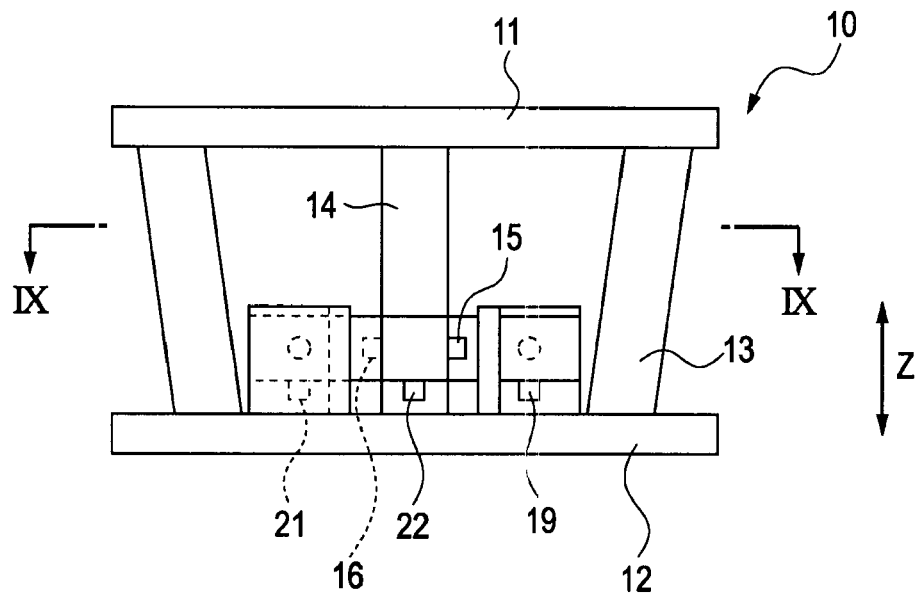
FIG. 8 is an enlarged view of a displacement detection unit in the gripping device of the related art.
Figure 9:
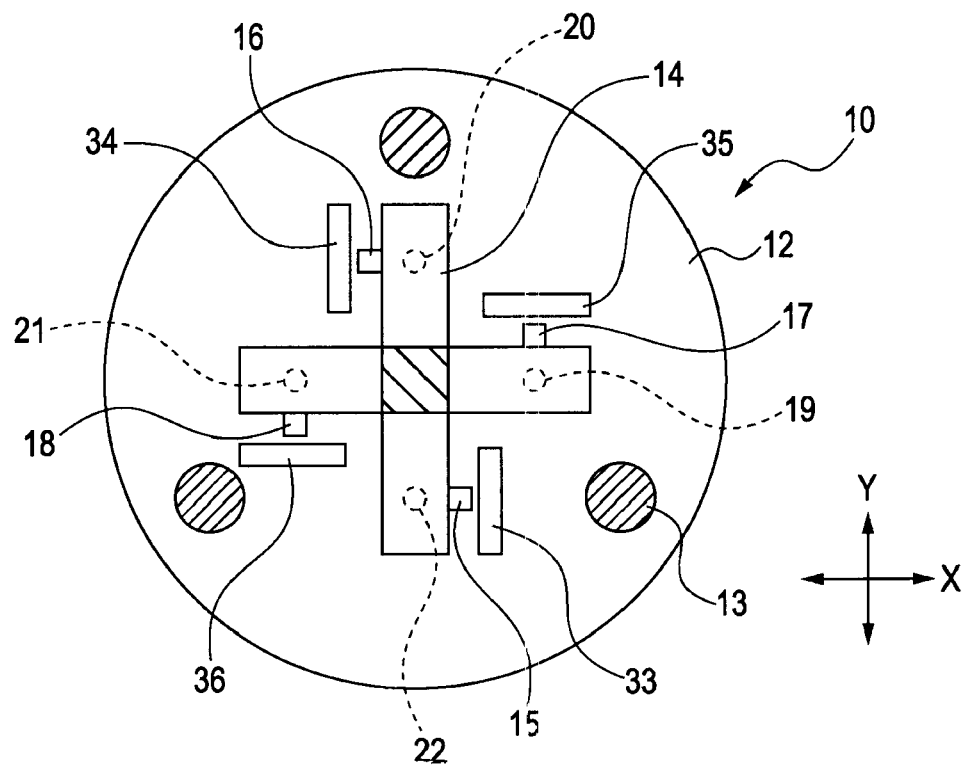
FIG. 9 is a cross-sectional plan view of the displacement detection unit, taken along line IX-IX of FIG. 8.

In the robot hand including the force sensor of the related art shown in FIG. 8, when the length of the elastic members 13 is reduced, the length of the beam 14 also needs to be reduced. For this reason, the distance from the joint portion with the plate 11 serving as the displacement fulcrum of the beam 14 to the leading end of the beam 14 is forced to be shortened. In this case, since the displacement of the displacement sensor 15 due to the operating force F decreases, the detection sensitivity decreases, as described above.

In the embodiment of the present invention, the elastic member 130 serving as the deformation fulcrum of the driving mechanism 120 relative to the gripping device housing 140 is provided between a position near the center of gravity of the grip section and the fingers 110. Since this increases deformation at the force sensor units 170, a sufficient detection sensitivity can be ensured. Further, since the sufficient detection sensitivity is ensured, there is no need to decrease the rigidity of the elastic member 130. Hence, the grip section will not wobble relative to the gripping device housing 140 during high-speed movement of the robotic arm 200, and it is possible to achieve both size reduction and speedup.

In addition, since the center of gravity of the grip section coincides with the deformation fulcrum of the elastic member 130, it is possible to minimize the influence of the moment, which is produced by the positional difference between the deformation fulcrum of the elastic member 130 and the center of gravity of the grip section, on the force sensor units 170. With this structure, it is particularly possible to shorten the time taken to stably position the gripping device during high-speed movement of the robotic arm 200 and to more easily respond to high speed operation.

Examples of the elastic member 130 will be described below. While the elastic member 130 may be formed by a one-piece support member shaped like a ring or a band of rubber or the like, or a plurality of rubber members that support the wall surface of the driving mechanism 120 at a plurality of fulcrums, it may be the following structure formed by leaf springs in order to adjust the difference in sensitivity among the detection axes, that is, X-, Y-, and Z-axes, of the force sensor.

Figure 5:
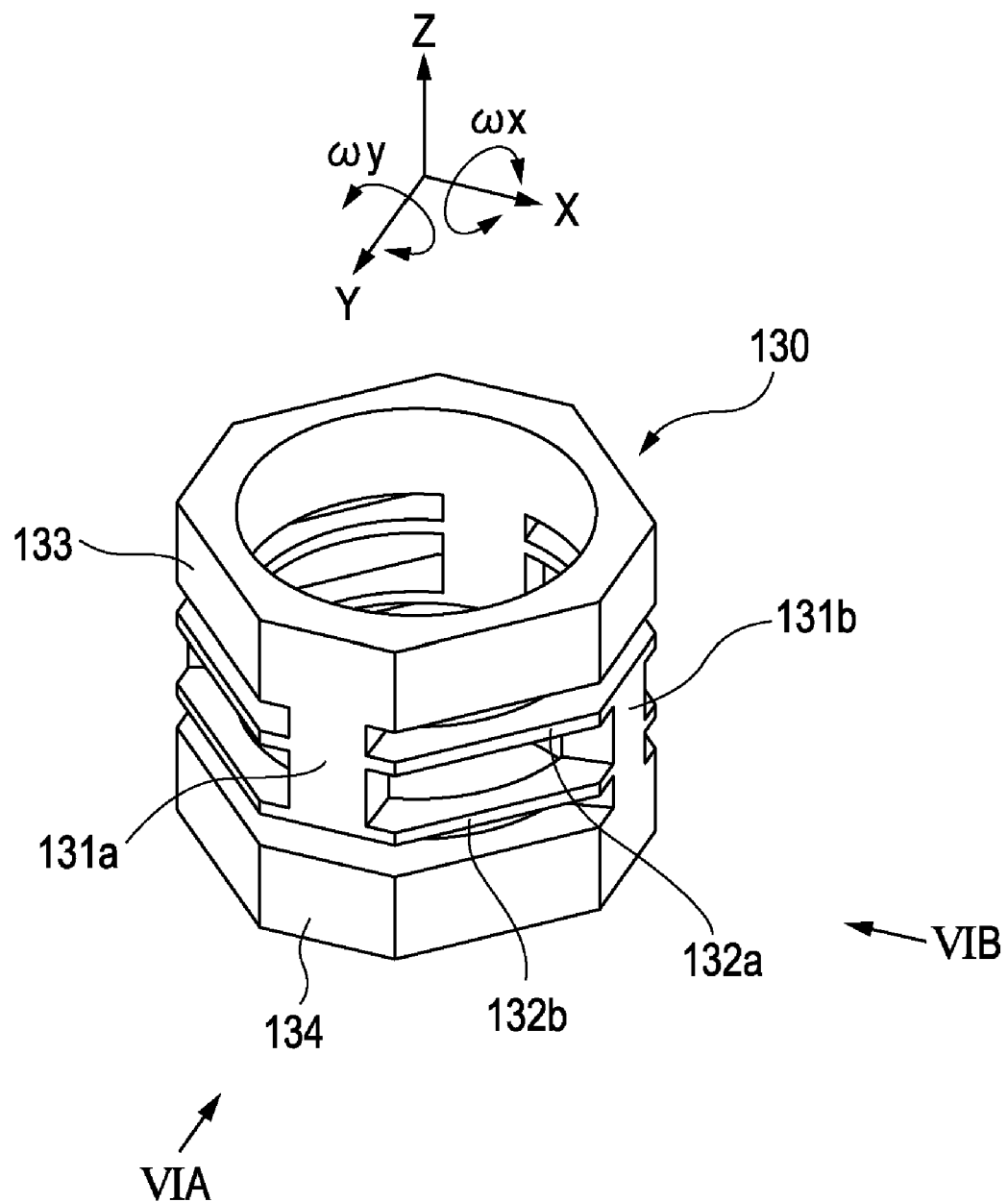
FIG. 5 shows an elastic member in the embodiment.
Figure 6A:
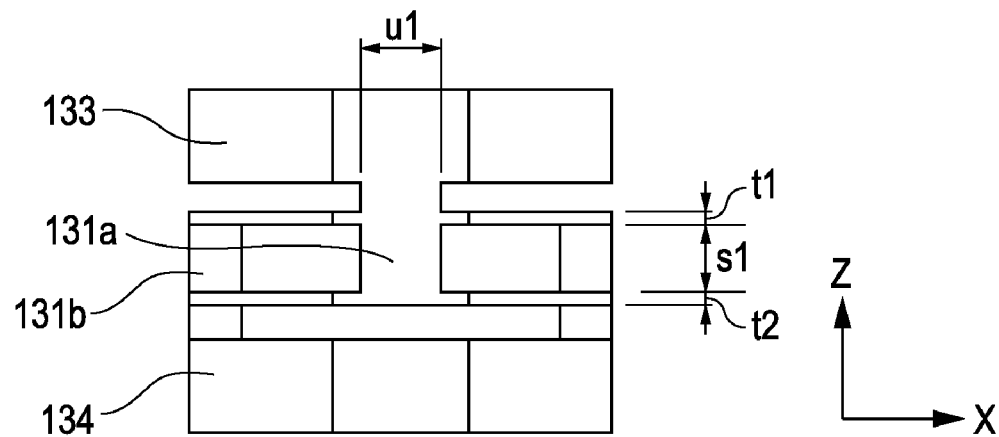
FIGS. 6A and 6B are views, respectively, on arrow VIA and arrow VIB of FIG. 5, respectively.
Figure 6B:
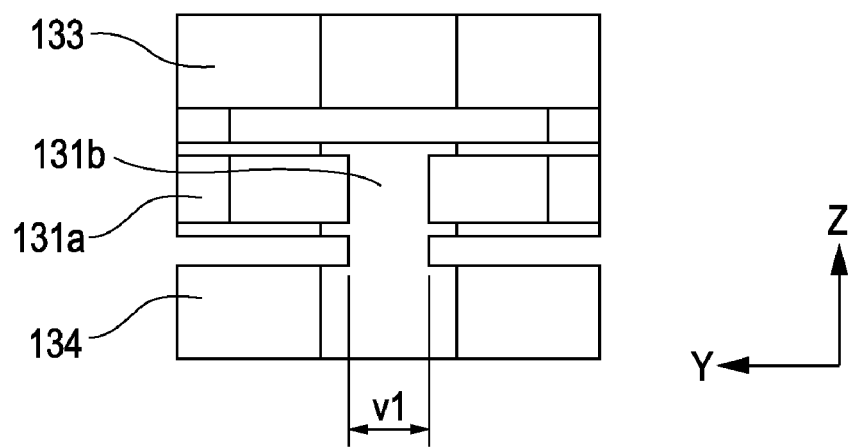
Figure 7:
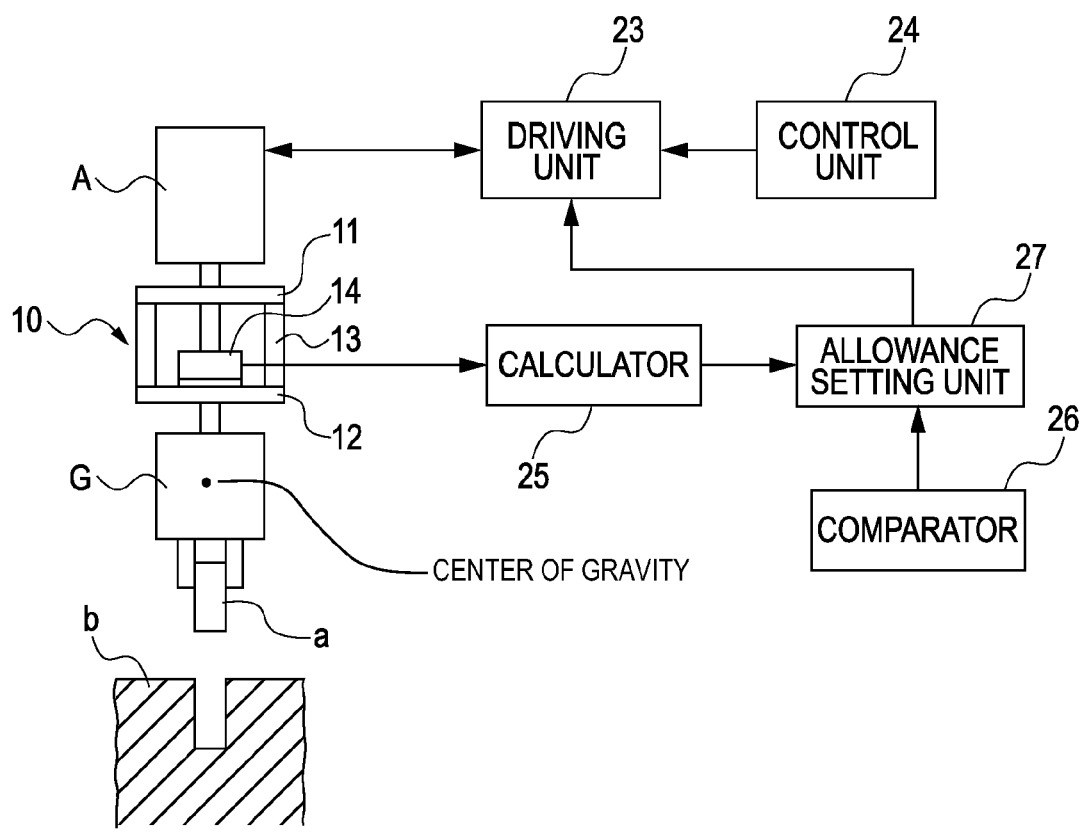
FIG. 7 is a schematic structural view of a gripping device of the related art.

FIG. 5 shows a specific structure of the elastic member 130 provided when the force sensor has three detection axes, that is, X-, Y-, and Z-axes. FIG. 6A is a view on arrow VIA of FIG. 5, and FIG. 6B is a view on arrow VIB of FIG. 5.

Referring to FIG. 5, an upper member 133 fixed to the driving mechanism 120 is provided on the +Z-side, and a lower member 134 fixed to the gripping device housing 140 is provided on the −Z-side. A leaf spring includes two leaf springs stacked in the Z-direction, namely, an upper leaf spring 132$a$ and a lower leaf spring 132$b$. Two leaf-spring support members 131$a$ spaced 180 degrees apart are combined with two-leaf spring support members 131$b$ spaced 180 degrees apart. The leaf-spring support members 131$a$ and 131$b$ support the leaf spring, and are respectively fixed to the upper member 133 and the lower member 134.

When an operating force F is applied to the fingers 110, the leaf spring bends, and the elastic member 130 thereby deforms elastically. The X- and Y-axes of detection of the force sensor respectively correspond to a rotation axis $\omega y$ about the Y-axis and a rotation axis $\omega x$ about the X-axis in the elastic member 130. While the displacements along the $\omega x$-axis and the $\omega y$-axis are increased to be larger at the sensor unit than at the deformation fulcrum of the elastic member 130, the displacement along the Z-axis is not increased because the displacement direction coincides with the displacement detection direction of the sensor unit. Accordingly, detection sensitivity of the sensor unit differs between when the operating force F acts in the X-direction and when the operating force F acts in the Z-direction in FIG. 2.

It is impossible to adjust this sensitivity difference between the Z-axis, and the $\omega x$-axis and the $\omega y$-axis by merely selecting the material of the elastic member 130. By stacking a plurality of leaf springs (elastic materials), as in the embodiment, the rigidity in the Z-axis direction in which displacement is not increased can be adjusted while maintaining the rigidities in the $\omega x$- and $\omega y$-axis directions. By adjusting thicknesses t1 and t2 of the leaf springs, a distance s1 between the leaf springs, and widths u1 and v1 of the leaf-spring support members, as shown in FIGS. 6A and 6B, the rigidities in the Z-, $\omega x$-, and $\omega y$-axis directions can be adjusted to desired values. In this case, cross-sectional areas of the leaf-spring support members 131$a$ and 131$b$ are sufficiently larger than the cross-sectional areas of the leaf springs 132$a$ and 132$b$, and the displacement amount of the leaf-spring support members is sufficiently smaller than the displacement amount of the leaf springs. This makes it possible to design the rigidity of the elastic member along each displacement axis and to reduce the sensitivity difference among the detection axes of the force sensor while increasing the rigidity of the elastic member. This enables accurate force detection.

The above-described embodiment is just exemplary, and does not limit the structures. Any component can be used as long as it can be gripped. While the two fingers 110 are shown in the figures, the number of fingers 110 is not limited to two as long as the fingers 110 can grip the component. For example, the driving mechanism 120 may be formed by any driving mechanism that allows gripping with the fingers 110, and may include any driving source (electromagnetic type or an air compression type) and any mechanism portion (e.g., gears, links). While the elastic member has three detection axes in the embodiment, the number of axes is not limited. The shape, number, and positions of the leaf springs and leaf-spring support members may be changed in accordance with the required number of axes. While the force sensor unit includes the Hall elements in the embodiment, any sensors can be used as long as they can detect the relative displacement (e.g., a laser displacement gauge or an eddy-current sensor). Further, detection along six axes (X, Y, Z, θx, θy, and θz axes, θ represents the rotation axes about the X-, Y-, and Z-axes) can be realized by changing the number and positions of the detection elements.

As described above, the gripping device including the force sensor according to the present invention can realize both a smaller size and a higher detection sensitivity than in the related art, and can grip and assemble small components at high speed under force control.

The present invention is applicable to a high-speed small gripping device for automated assembly with an industrial robot.

An embodiment of the invention can provide a gripping device that grips a component, the gripping device comprising: a grip section including a plurality of fingers configured to grip the component, and a driving mechanism connected to the fingers so as to drive the fingers; a housing configured to elastically support the driving mechanism with an elastic member being disposed therebetween, the housing containing a part of the driving mechanism; and force sensor units respectively provided on an end portion of the driving mechanism opposite the fingers and at a position on the housing facing the end portion, wherein the elastic member is provided between a position near the center of gravity of the grip section and the fingers.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-279872 filed Oct. 30, 2008 and No. 2009-229652 filed Oct. 1, 2009, which are hereby incorporated by reference herein in their entirety.

What is claimed is:

1. A gripping device that grips a component, the gripping device comprising:
    a gripping section having at least one gripping element configured to grip the component, and a driving mechanism connected to the gripping element for driving the gripping element;
    a housing;
    an elastic member disposed between the housing and the driving mechanism; and
    force sensor units provided on an end portion of the driving mechanism opposite the gripping element and at a position on the housing facing the end portion,
    wherein the housing is configured to elastically support the driving mechanism only by the elastic member provided between a center of gravity of the gripping section, and the gripping element.

2. The gripping device according to claim 1, wherein the elastic member is configured to be provided at the center of gravity of the gripping section.

3. The gripping device according to claim 1, wherein the elastic member is configured to serve as a deformation fulcrum of the gripping section relative to the housing.

4. The gripping device according to claim 3, wherein the gripping section and the elastic member are configured such that the centre of gravity of the gripping section substantially coincides with the deformation fulcrum of the elastic member.

5. The gripping device according to claim 1, wherein the elastic member is formed by a structure in which a plurality of leaf springs are stacked.

6. The gripping device according to claim 1, wherein the elastic member is formed by a rubber shaped ring or a band.

7. The gripping device according to claim 1, wherein the force sensor units comprise at least one Hall element configured to detect displacement of the driving mechanism relative to the housing, and a magnet configured to serve as a magnetic-field generating source.

8. The gripping device according to claim 1, wherein the housing is configured to contain a part of the driving mechanism and wherein the gripping element comprises at least one finger.

9. A system for controlling a robotic arm, comprising:
    the gripping device of claim 1, wherein the gripping device is configured for attachment to the robotic arm; and
    a control unit configured to control the robotic arm and the gripping device.

* * * * *